(12) United States Patent
Tonegawa (10) Patent No.: US 9,071,801 B2
(45) Date of Patent: Jun. 30, 2015

(54) IMAGE FORMING APPARATUS, CONTROL METHOD THEREFOR AND STORAGE MEDIUM

(75) Inventor: Nobuyuki Tonegawa, Kawasaki (JP)

(73) Assignee: CANON KABUSHIKI KAISHA (JP)

( * ) Notice: Subject to any disclaimer, the term of this patent is extended or adjusted under 35 U.S.C. 154(b) by 188 days.

(21) Appl. No.: 13/323,894

(22) Filed: Dec. 13, 2011

(65) Prior Publication Data

US 2012/0154835 A1    Jun. 21, 2012

(30) Foreign Application Priority Data

Dec. 15, 2010   (JP) ................................. 2010-279277

(51) Int. Cl.
 G06F 3/12   (2006.01)
 H04N 1/00   (2006.01)
 H04N 1/40   (2006.01)
 H04N 1/60   (2006.01)

(52) U.S. Cl.
 CPC ...................................... *H04N 1/60* (2013.01)

(58) Field of Classification Search
 USPC .................. 358/1.15, 1.9, 400, 405, 444, 442
 See application file for complete search history.

(56) References Cited

U.S. PATENT DOCUMENTS

| | | | | |
|---|---|---|---|---|
| 5,485,283 A * | 1/1996 | Kaneko | .......................... | 358/518 |
| 5,946,106 A * | 8/1999 | Itoh et al. | ....................... | 358/442 |
| 5,956,466 A * | 9/1999 | Horiuchi et al. | ............... | 358/1.9 |
| 6,005,673 A * | 12/1999 | Murai et al. | ................... | 358/434 |
| 6,151,133 A * | 11/2000 | Sakauchi et al. | ............. | 358/1.15 |
| 6,188,766 B1 * | 2/2001 | Kocher | .......................... | 380/246 |
| 6,278,529 B1 * | 8/2001 | Akimoto | ......................... | 358/1.9 |
| 6,359,707 B1 * | 3/2002 | Tadokoro et al. | ............. | 358/500 |
| 6,563,598 B1 * | 5/2003 | Johnson et al. | .............. | 358/1.15 |
| 6,611,355 B1 * | 8/2003 | Kizawa | ........................... | 358/1.9 |
| 7,027,172 B1 * | 4/2006 | Parulski et al. | .............. | 358/1.15 |
| 7,675,640 B2 * | 3/2010 | Ishii et al. | .................... | 358/1.15 |
| 8,237,965 B2 * | 8/2012 | Takemoto | ..................... | 358/1.15 |
| 8,312,124 B2 * | 11/2012 | Munetomo | .................... | 709/223 |
| 8,405,842 B2 * | 3/2013 | Munetomo | ................... | 358/1.14 |
| 8,472,051 B2 * | 6/2013 | Sakiyama et al. | ........... | 358/1.15 |

(Continued)

FOREIGN PATENT DOCUMENTS

| JP | 2001086350 A | 3/2001 |
|---|---|---|
| JP | 2004284034 A | 10/2004 |

(Continued)

OTHER PUBLICATIONS

Office Action issued in corresponding Japanese Patent Application 2010-279277, dated Oct. 14, 2014.

*Primary Examiner* — Madelein Nguyen (74) *Attorney, Agent, or Firm* — Rossi, Kimms & McDowell LLP (57) ABSTRACT

An image forming apparatus that enables to output a transmission result report without confusing a user even if a part of printing mechanisms or a printing function is broken. A report output unit generates a transmission result report showing a result of transmission of image data and causes the printing unit to output the transmission result report. A setting unit sets whether to add a part of the transmitted image data to the transmission result report as an additional image. A control unit creates and outputs the transmission result report without adding the additional image even if the setting unit sets to add the additional image, when the transmitted image data is the color image and when the printing unit cannot print a color image and can print a monochrome image.

10 Claims, 10 Drawing Sheets

(56) References Cited

U.S. PATENT DOCUMENTS

| | | | |
|---|---|---|---|
| 2001/0024301 A1* | 9/2001 | Kohri | 358/500 |
| 2002/0015166 A1* | 2/2002 | Wakai et al. | 358/1.11 |
| 2002/0093698 A1* | 7/2002 | Kagawa | 358/518 |
| 2002/0186427 A1* | 12/2002 | Orikasa | 358/515 |
| 2003/0090695 A1* | 5/2003 | Murata | 358/1.13 |
| 2003/0193692 A1* | 10/2003 | Matsuyama | 358/2.1 |
| 2004/0075871 A1* | 4/2004 | Itoh | 358/440 |
| 2005/0052687 A1* | 3/2005 | Hirakawa | 358/1.15 |
| 2005/0168764 A1* | 8/2005 | Yamamura | 358/1.13 |
| 2006/0039707 A1* | 2/2006 | Mima | 399/23 |
| 2006/0126101 A1* | 6/2006 | Shutt et al. | 358/1.15 |
| 2006/0187475 A1* | 8/2006 | Fujioka | 358/1.9 |
| 2006/0279780 A1* | 12/2006 | Anno et al. | 358/1.15 |
| 2006/0291000 A1* | 12/2006 | Maeda et al. | 358/452 |
| 2006/0291002 A1* | 12/2006 | Obata | 358/464 |
| 2007/0002390 A1* | 1/2007 | Nakabayashi | 358/401 |
| 2007/0177193 A1* | 8/2007 | Kumakura | 358/1.15 |
| 2007/0195362 A1* | 8/2007 | Yamada et al. | 358/1.15 |
| 2008/0002225 A1* | 1/2008 | Iwasaki | 358/1.15 |
| 2008/0030792 A1* | 2/2008 | Shiiyama | 358/402 |
| 2008/0106751 A1* | 5/2008 | Kobashigawa | 358/1.13 |
| 2008/0124108 A1* | 5/2008 | Tokuyama et al. | 399/62 |
| 2008/0130030 A1* | 6/2008 | Okunishi et al. | 358/1.9 |
| 2008/0316520 A1* | 12/2008 | Suzuki et al. | 358/1.13 |
| 2008/0316531 A1* | 12/2008 | Suzuki et al. | 358/1.15 |
| 2009/0153898 A1* | 6/2009 | Sato | 358/1.15 |
| 2009/0213396 A1* | 8/2009 | Togami | 358/1.9 |
| 2009/0273802 A1* | 11/2009 | Kajiyama | 358/1.15 |
| 2009/0296115 A1* | 12/2009 | Kim et al. | 358/1.9 |
| 2010/0118338 A1* | 5/2010 | Sakiyama et al. | 358/1.15 |
| 2010/0149589 A1* | 6/2010 | Hayashi et al. | 358/1.15 |
| 2010/0214590 A1* | 8/2010 | Ray et al. | 358/1.14 |
| 2010/0231994 A1* | 9/2010 | Kashibuchi et al. | 358/505 |
| 2010/0245908 A1* | 9/2010 | Tonegawa | 358/1.15 |
| 2010/0253956 A1* | 10/2010 | Kobayashi et al. | 358/1.9 |
| 2011/0116128 A1* | 5/2011 | Tamada | 358/1.15 |
| 2011/0191131 A1* | 8/2011 | Katoh et al. | 705/7.11 |
| 2011/0292442 A1* | 12/2011 | Nakagawa | 358/1.15 |
| 2012/0120427 A1* | 5/2012 | Ohira | 358/1.9 |
| 2012/0154835 A1* | 6/2012 | Tonegawa | 358/1.9 |
| 2012/0212763 A1* | 8/2012 | Honma | 358/1.13 |
| 2013/0057885 A1* | 3/2013 | Minowa | 358/1.9 |
| 2013/0314734 A1* | 11/2013 | Suzuki | 358/1.13 |
| 2013/0321874 A1* | 12/2013 | Kaneko et al. | 358/3.28 |
| 2014/0063552 A1* | 3/2014 | Maeda | 358/1.15 |

FOREIGN PATENT DOCUMENTS

| | | |
|---|---|---|
| JP | 2006-245768 A | 9/2006 |
| JP | 2006-279721 A | 10/2006 |
| JP | 2008-134560 A | 6/2008 |

* cited by examiner

```
2000 05/22 MON 13:25                iR01234                         001
```
```
                    *****************************
                    *** Transmission Result Report ***
                    *****************************
```
300 — Receipt Number            0124
301 — Section ID                2796
302 — Start Time                06/11 14:29
303 — Transmitted Document Name Estimate
304 — The Number of Sheets      5
305 — Non-Communication Destinations  ----
306 — Finished Destinations     info@xxxx.co.jp
                                                              308
307 — Error Destinations        ----

Letter of Transmittal   Urgent !

June 29, 1999

XXXX Computer Co., Ltd.                      YYYY Co., Ltd.
Mr.XX
TEL 111-111-1111                             TEL 111-111-1111
FAX 111-111-1112                             FAX 111-111-1112

Please provide an estimate of the following system configuration.

Tower Type
    CPU            PentumII300MHz
    RAM            64MB
    VideoMemorye   4MB     Quantity       2

*FIG. 7*

| 2000 05/22 MON 13:25 | iR01234 | 001 |

```
****************************
*** Transmission Result Report ***
****************************
```

- 300 — Receipt Number            0124
- 301 — Section ID                  2796
- 302 — Start Time                  06/11 14:29
- 303 — Transmitted Document Name    Estimate
- 304 — The Number of Sheets       5
- 305 — Non-Communication Destinations   ----
- 306 — Finished Destinations       info@xxxx.co.jp
- 307 — Error Destinations         ----

320

Color image cannot be provided due to breakdown.

FIG. 8

```
2000 05/22 MON 13:25                                               001
    ******************************
             Fax Transmission Result Report
    ******************************
         The Following Transmission Is Completed
300~ Receipt Number                    0124
301~ Section ID                        2796
310~ Destination Address               044-111-111
311~ F Code                            123456789
312~ Abbreviated Name of Destination   XXXX Co., Ltd.
302~ Start Time                        06/11 14:29
313~ Communication Time                01'17
304~ The Number of Sheets              1
314~ Communication Result              OK             308
```

Letter of Transmittal  Urgent !

June 29, 1999

XXXX Computer Co., Ltd.
Mr.XX
TEL 044-111-1110
FAX 044-111-1111

YYYY Co., Ltd.

TEL 03-111-1111
FAX 03-111-1110

Please provide an estimate of the following system configuration.

| Tower Type | |
|---|---|
| CPU | PentumII300MHz |
| RAM | 64MB |
| VideoMemorye | 4MB |
| Quantity | 2 |

FIG. 9

```
2000 05/22 MON 13:25                                              001
  ******************************
           Fax Transmission Result Report
  ******************************
         The Following Transmission Is Completed
 300 — Receipt Number              0124
 301 — Section ID                  2796
 310 — Destination Address         044-111-111
 311 — F Code                      123456789
 312 — Abbreviated Name of Destination   XXXX Co., Ltd.
 302 — Start Time                  06/11 14:29
 313 — Communication Time          01'17
 304 — The Number of Sheets        1
 314 — Communication Result        OK
```

320

Color image cannot be provided due to breakdown.

IMAGE FORMING APPARATUS, CONTROL METHOD THEREFOR AND STORAGE MEDIUM

BACKGROUND OF THE INVENTION

1. Field of the Invention

The present invention relates to an image forming apparatus, a control method therefor and a storage medium, and more particularly, to an image forming apparatus that has a function of transmitting image data to a transmission address and outputting a transmission result report showing a result of the transmission, a control method therefor and a storage medium.

2. Description of the Related Art

In general, an image forming apparatus such as a multi function peripheral (MFP) has a transmission and reception function for transmitting and receiving image data and includes a printing mechanism. When the image forming apparatus receives image data, the printing mechanism executes printing according to the image data.

If a component such as a developing unit included in the printing mechanism is broken in the image forming apparatus, the image forming apparatus displays a so-called service man call (error display) and enters a disabled state.

However, even if a user requests inspection and repair by a service man based on the display of the service man call, the service man may not come quickly. In such a case, the image forming apparatus is disabled for a long time.

To handle the situation, there is, for example, a technique for using another usable toner to execute printing when a disabled toner due to such as a lack of toner is sensed. (for example, see Japanese Laid-Open Patent Publication (Kokai) No. 2001-86350).

In an image forming apparatus with a plurality of printing mechanisms such as a color image forming apparatus, there is a technique for using another operable printing unit to execute printing in place of an inoperable printing unit (for example, see Japanese Laid-Open Patent Publication (Kokai) No. 2004-284034).

In this case, for example, if a magenta (M) printing unit is broken, a cyan (C) printing unit executes printing related to an M toner and a C toner.

As described above, even if the printing mechanism cannot be used, image data can be transmitted if the transmission function included in the image forming apparatus normally operates.

However, if a transmission result report including at least a part of the transmitted image data is set to be printed after the completion of the transmission of the image data, the transmission result report cannot be printed when the printing mechanism is disabled although the image data can be transmitted. As a result, transmission result reports are stacked in a memory included in the image forming apparatus.

If transmission operations of image data are repeated in this state, there is a problem that the memory capacity becomes full, and the transmission operations are terminated. More specifically, even if the communication function normally operates in the image forming apparatus, the communication function may not be able to be used if the printing mechanism is broken.

Also, if monochrome printing is executed in place of color printing when the color printing cannot be executed as in the above-described conventional techniques, a monochrome image is attached to the transmission result report even though color image data is actually transmitted. This may confuse the user.

SUMMARY OF THE INVENTION

Accordingly, the present invention provides an image forming apparatus comprising a printing unit capable of printing a color image and a monochrome image, a transmission unit configured to transmit image data to a transmission address, a report output unit configured to generate a transmission result report showing a result of transmission by the transmission unit and to cause the printing unit to output the transmission result report, a setting unit configured to set whether to add at least a part of the image data transmitted by the transmission unit to the transmission result report as an additional image, and a control unit configured to control to create and output the transmission result report without adding the additional image even if the setting unit sets to add the additional image, when the image data transmitted by the transmission unit is the color image and when the printing unit cannot print the color image and can print the monochrome image.

According to the present invention, a transmission result report can be output without confusing a user even if a part of printing mechanisms or a printing function is broken.

The features and advantages of the invention will become more apparent from the following detailed description taken in conjunction with the accompanying drawings.

DESCRIPTION OF THE EMBODIMENTS

Hereinafter, an example of an image forming apparatus according to the embodiment of the present invention will be described with reference to the drawings.

Figure 1:
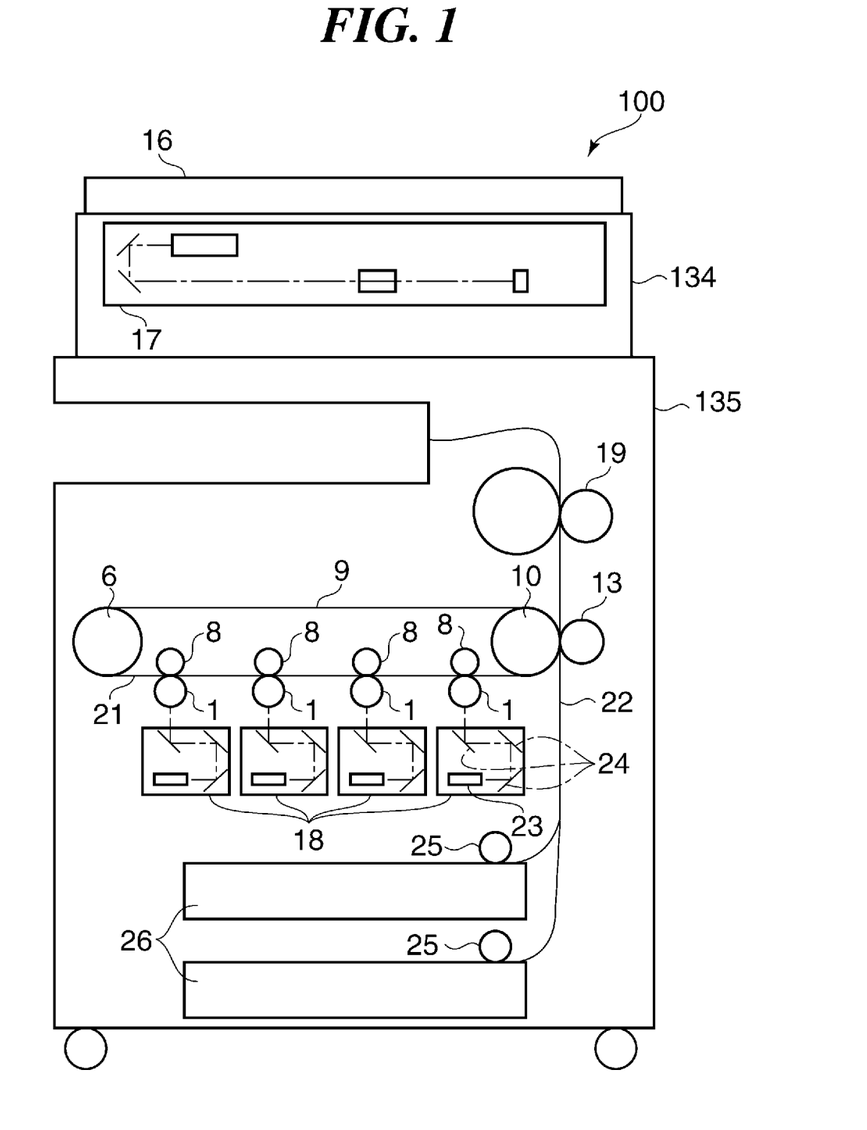
FIG. 1 is a diagram showing a schematic configuration of a full-color MFP as an example of an image forming apparatus according to the embodiment of the present invention.

FIG. 1 is a diagram showing a schematic configuration of a full-color MFP (Multi Function Peripheral) as an example of the image forming apparatus according to the embodiment of the present invention.

In FIG. 1, an MFP 100 includes a scanner 134 and a printer (printing unit) 135. The printer 135 includes a plurality of laser scanner units 18 and an intermediate transfer unit 21. The printer 135 can print color images and monochrome images.

To execute copying, an original is placed on a platen 16 of the scanner 134. A reader unit 17 optically reads the original to obtain an image signal. An image processing control unit (not shown) applies image processing to the image signal, and then the image signal is transmitted to the laser scanner units 18.

In the shown example, the printer 135 includes the laser scanner units 18 corresponding to yellow (Y), cyan (C), magenta (M), and black (K). The laser scanner units 18 emit a laser beam from a laser oscillation unit (not shown) according to the image signal. Polygon mirrors 23 reflect the laser beam, and folded mirrors 24 cause the laser beam to enter photosensitive drums 1 through a plurality of optical lenses (not shown).

The photosensitive drums 1 rotate in synchronization with the image signal, and electrostatic latent images are formed on the photosensitive drums 1 by the laser beam. A developing unit (not shown in FIG. 1) develops the electrostatic latent images, and toner images are formed on the photosensitive drums 1. Transfer rollers 8 sequentially transfer the toner images to an intermediate transfer belt 9 (primary transfer), and color toner images are formed on the intermediate transfer belt 9.

The printer 135 includes a plurality of paper feeding cassettes 26, and transfer sheets are loaded on each of the paper feeding cassettes 26. Paper feeding rollers 25 pick up the transfer sheets from the paper feeding cassettes 26, and a plurality of conveyance rollers (not shown) convey the transfer sheets through a transfer sheet conveyance path 22.

The color toner images on the intermediate transfer belt 9 are transferred to the transfer sheets at a nip portion between a transfer drive roller 10 and a transfer outer roller 13. The transfer sheets with the transferred toner images are transmitted to a fixing unit 19, and the fixing unit 19 fixes the color toner images on the transfer sheets. The transfer sheets are then discharged to a sheet discharge tray.

Figure 2A:
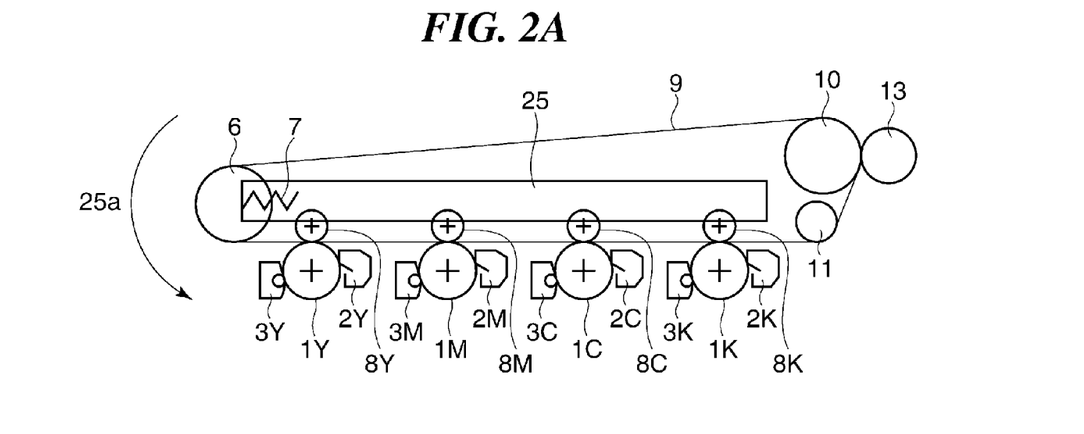
FIGS. 2A and 2B are diagrams showing details of photosensitive drums and an intermediate transfer unit in the full-color MFP shown in FIG. 1, FIG. 2A being a diagram showing image formation in a full-color mode, FIG. 2B being a diagram showing image formation in a monochrome mode.
Figure 2B:
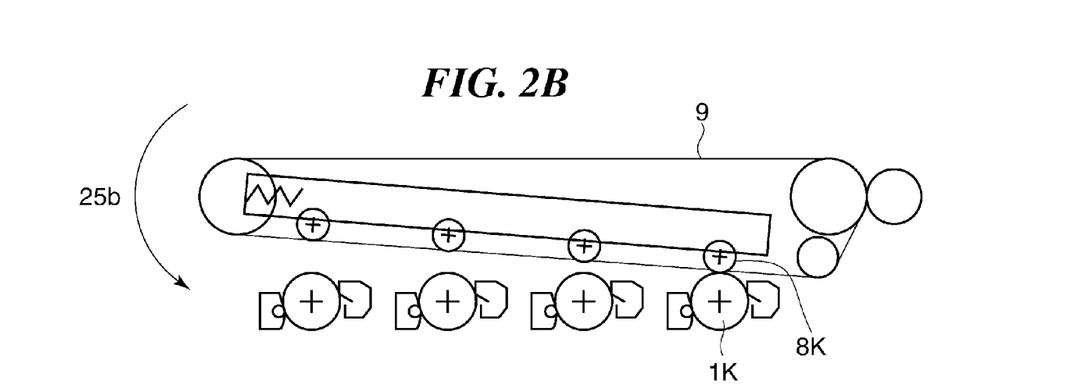

FIGS. 2A and 2B are diagrams showing details of the photosensitive drums and the intermediate transfer unit in the full-color MFP 100 shown in FIG. 1. FIG. 2A is a diagram showing image formation in a full-color mode, and FIG. 2B is a diagram showing image formation in a monochrome mode.

As described above, in FIGS. 1, 2A, and 2B, the photosensitive drums 1 are arranged for each of yellow (Y), magenta (M), cyan (C), and black (K) colors, and motors (not shown) provided to each of the photosensitive drums 1 rotate and drive the photosensitive drums clockwise in FIGS. 1, 2A, and 2B. It should be noted that in FIGS. 2A and 2B, reference numerals 1Y, 1M, 1C, and 1K are provided to the photosensitive drums, and reference numerals 8Y, 8M, 8C, and 8K are provided to the transfer rollers for distinction between colors.

As described above, developing devices 3Y, 3M, 3C, and 3K develop the electrostatic latent images on the photosensitive drums 1Y, 1M, 1C, and 1K, respectively, to form Y toner images, M toner images, C toner images, and K toner images. The Y toner images, the M toner images, the C toner images, and the K toner images are sequentially transferred to the intermediate transfer belt 9 and placed on top of each other.

After the transfer, cleaning units 2Y, 2M, 2C, and 2K remove remaining toners remained on the photosensitive drums 1Y, 1M, 1C, and 1K, respectively, to clean the photosensitive drums 1Y, 1M, 1C, and 1K.

The intermediate transfer unit 21 includes a transfer frame 25 as well as a tension roller 6, a tension spring 7, the transfer drive roller 10, an idler roller 11, and transfer rollers 8K, 8C, 8M, and 8Y.

The transfer drive roller 10 and the idler roller 11 are supported by a main body frame (not shown) of the MFP. The tension roller 6, the tension spring 7, and the transfer rollers 8K, 8C, 8M, and 8Y are supported by the transfer frame 25. The transfer frame 25 is arranged to be able to rotate about the transfer roller 8K as the rotation center.

In the full-color mode, as shown in FIG. 2A, the transfer frame 25 is rotated and driven in a direction shown by a solid arrow 25a in FIG. 2A, about the transfer roller 8K as the rotation center. All of the photosensitive drums 1Y, 1M, 1C, and 1K touch the intermediate transfer belt 9.

Meanwhile, in the monochrome (black and white) mode, as shown in FIG. 2B, the transfer frame 25 is rotated and driven in a direction shown by a solid arrow 25b in FIG. 2B, about the transfer roller 8K as the rotation center. Only the photosensitive drum 1K touches the intermediate transfer belt 9 (the photosensitive drum 1K always touches the intermediate transfer belt 9 regardless of whether the mode is the full-color mode or the monochrome mode).

Figure 3:
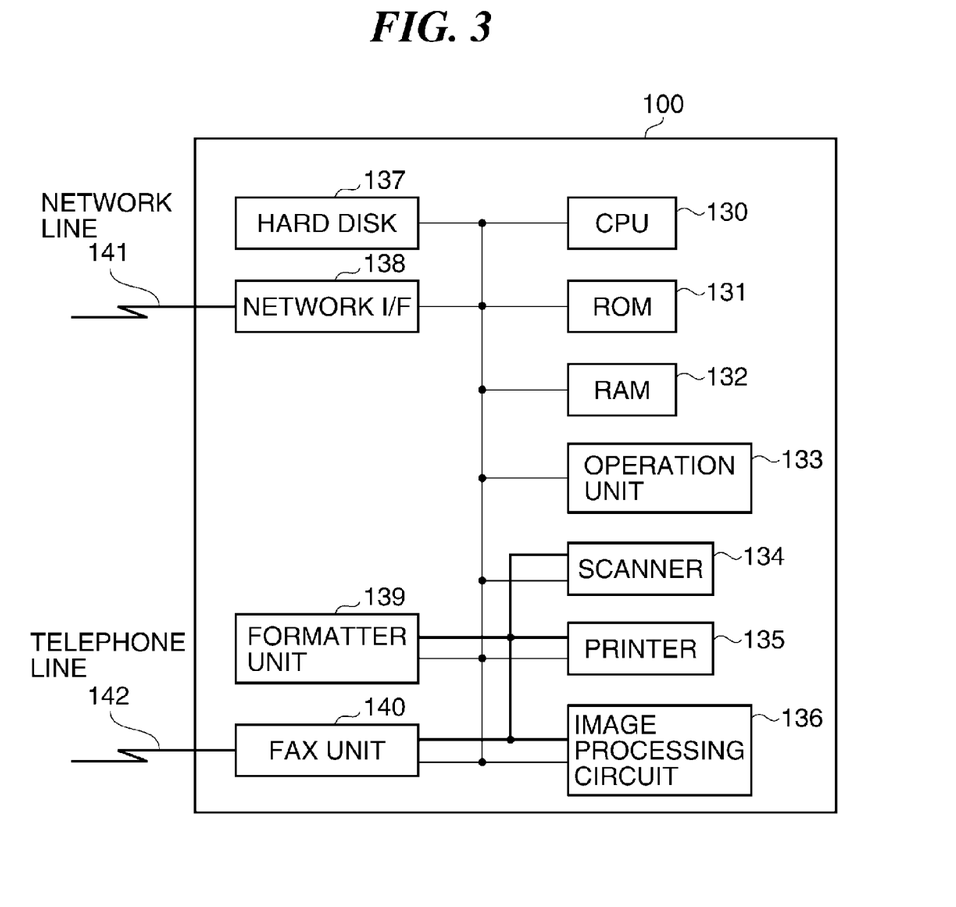
FIG. 3 is a block diagram showing an example of a control system of the full-color MFP shown in FIG. 1.

FIG. 3 is a block diagram for explaining an example of a control system of the MFP 100 shown in FIG. 1.

In FIG. 3, the MFP 100 includes a CPU (Central Processing Unit) 130. The CPU 130 uses a RAM 132 as a work memory to execute a control program stored in a ROM 131 to control the MFP 100.

An operation unit 133, the scanner 134, the printer 135, an image processing circuit 136, a hard disk 137, a network interface (I/F) 138, a formatter unit 139, and a fax unit 140 are connected to the CPU 130 through a bus. The network interface 138 is connected to a network line 141, and the fax unit 140 is connected to a telephone line 142.

The operation unit 133 includes an LCD (liquid crystal) display panel and hard keys such as a start key and a numeric keypad (which are not shown). The operation unit 133 displays buttons on the LCD display panel based on the control by the CPU 130. When a user touches the buttons on the LCD display panel by a finger, a process is executed according to the touched buttons.

The scanner 134 reads an image on the original to generate image data (an image signal) as described above. The printer 135 prints the image on a transfer sheet based on the image data.

The image processing circuit 136 includes a large-capacity image memory, an image rotation circuit, and a resolution scaling circuit as well as encoding/decoding circuits of MH, MR, MMR, JBIG, JPEG, etc. The image processing circuit 136 can also execute various image processing such as shading, trimming, and masking.

The hard disk 137 is a large-capacity recording medium connected by an I/F such as SCSI, or IDE.

The network I/F 138 executes a network data link for connecting with the network line 141, such as Ethernet (registered trademark) represented by 10BASE-T and 100BASE-T or a token ring.

The formatter unit 139 is a rendering circuit for creating an image to be printed by the printer 135. For example, when PDL (Page Description Language) data is received from a PC (not shown) through the network I/F 138, the formatter unit 139 generates image data from the PDL data. The image processing circuit 136 applies image processing to the image data generated by the formatter unit 139, and then the printer 135 prints the image data.

It should be noted that the scanner 134, the printer 135, the image processing circuit 136, and the formatter unit 139 are connected to the CPU 130 through the bus (CPU bus) as shown in FIG. 3 and are also connected to each other through another high-speed video bus. The image data is quickly transferred through the high-speed video bus.

As described above, in the copy operation, the image processing circuit 136 applies image processing to the image data obtained as a result of reading by the scanner 134, and the printer 135 prints the image data.

The fax unit 140 executes facsimile communication with an external apparatus (not shown) connected to the telephone line 142. For example, the fax unit 140 transmits the image data processed by the image processing circuit 136 to the external apparatus by facsimile communication through the telephone line 142. The fax unit 140 also receives image data from the external apparatus by facsimile communication through the telephone line 142. The image processing circuit 136 applies image processing to the image data, and then the printer 135 prints the image data.

In addition, if the image data obtained as a result of reading by the scanner 134 is converted by the image processing circuit 136 to image data of JPEG, PDF, TIFF, etc., the image data such as PDF can be transmitted through the network I/F 138 using a communication protocol such as SMTP, FTP, or SMB. More specifically, the MFP 100 has SEND functions.

In the present embodiment, among the SEND functions, a function for transmitting an image file of JPEG, PDF, TIFF, etc., by the SMTP protocol will be called an email transmission function. A function for transmitting the image file by FTP or SMB will be called a file transmission function.

One of the SEND functions is an Internet facsimile function defined by RFC 2305. The Internet facsimile (IFAX) function allows attaching an image file to email to transmit and receive the image file between similar devices.

For example, the image processing circuit 136 processes the image data obtained as a result of reading by the scanner 134 to create a TIFF file defined by RFC 3949. The TIFF file is attached to email and transmitted by the SMTP protocol based on the IFAX function.

Meanwhile, the email is received by an SMTP or POP3 function. The image processing circuit 136 converts the TIFF file to an internal image format, and the printer 135 prints the TIFF file.

Figure 4:
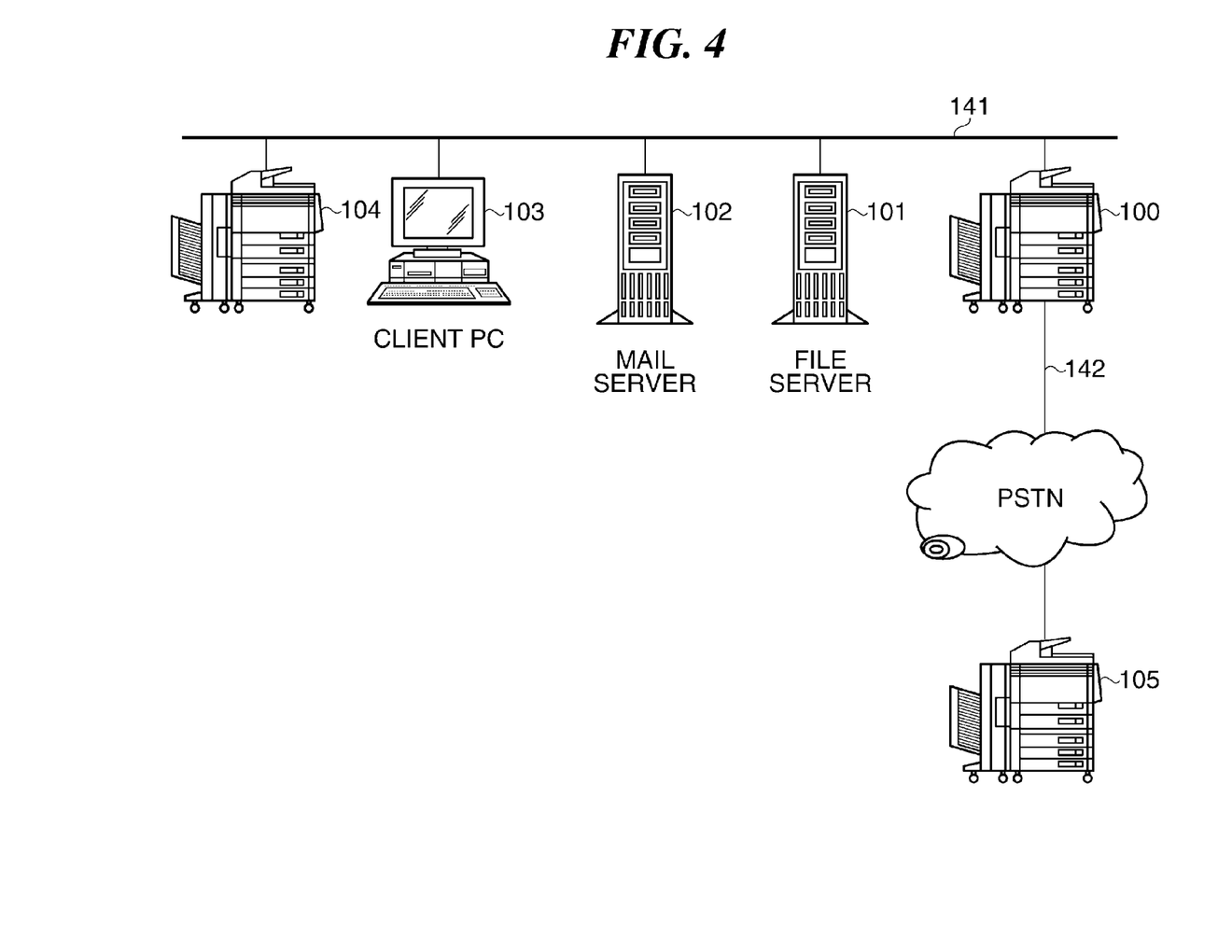
FIG. 4 is a diagram for explaining an example of a communication system using the full-color MFP shown in FIG. 1.

FIG. 4 is a diagram for explaining an example of a communication system using the MFP 100 shown in FIG. 1.

In FIG. 4, a plurality of MFPs 100, 104, and 105 are arranged in the shown communication system. It should be noted that the MFPs 104 and 105 are MFPs with the same configurations and functions as the MFP 100 described in FIGS. 1 to 3.

In the shown example, the MFP 100 and the MFP 104 are connected to the network line 141, and a file server 101, a mail server 102, and a client PC 103 are connected to the network line 141.

The mail server 102 executes a control program for operating an email communication protocol such as SMTP or POP3. Based on this, the mail server 102 distributes email to a transmission address. Email client software is installed on the client PC 103. Email created by the client PC 103 is transmitted to the mail server 102, and the mail server 102 receives the email by the POP3 protocol.

Meanwhile, when the image file transmitted by the MFP 100 based on the email transmission function is received, the mail server 102 transmits the image file to the client PC 103. In the client PC 103, an image viewer can be used to view the received image file by the user.

When the image file transmitted by the MFP 100 based on the file transmission function is received, the file server 101 transmits the image file to the client PC 103. In the client PC 103, the received image file can be viewed by the user using the image viewer.

The image TIFF file obtained as a result of reading by the scanner 134 in the MFP 100 is transmitted to the MFP 104 through the mail server 102 based on the IFAX function. The MFP 104 prints the received image TIFF file by the printer 135.

To execute facsimile transmission from the MFP 100 to the MFP 105, the fax unit 140 processes the image data obtained as a result of reading by the scanner 134 in the MFP 100. In the MFP 100, the fax unit 140 transmits the image data to the MFP 105 by facsimile through the telephone line 142 of PSTN. The MFP 105 prints the received image data by the printer 135.

Figure 5:
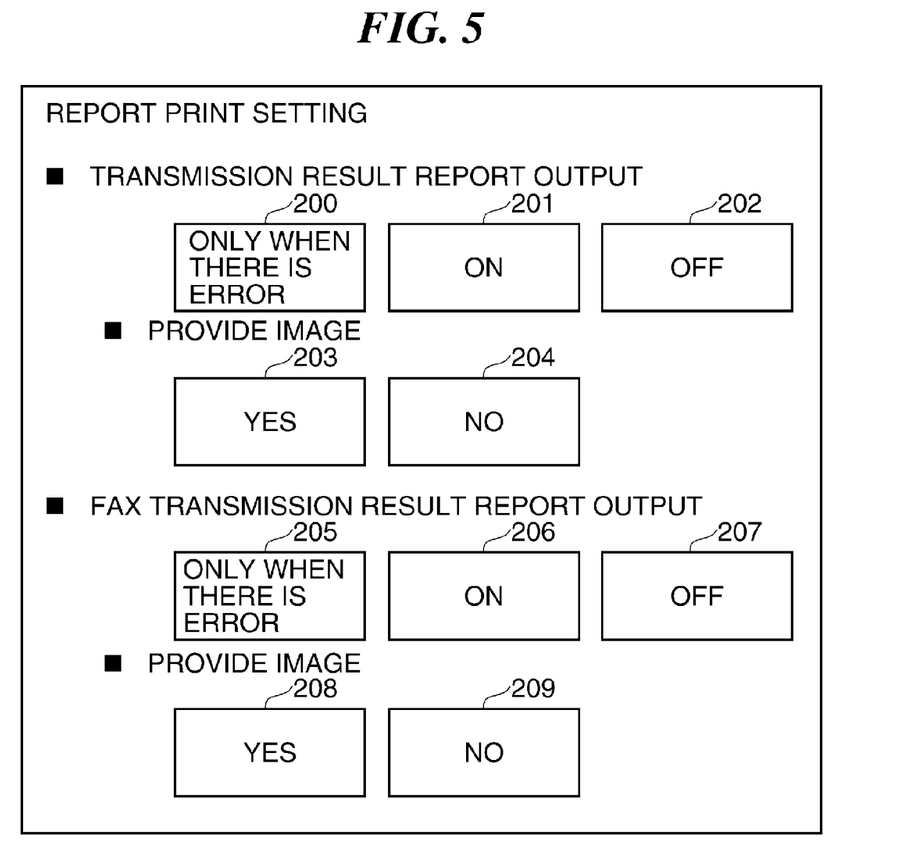
FIG. 5 is a diagram showing a setting screen for setting printing of a transmission result after transmission of image data by SEND functions included in the full-color MFP shown in FIG. 1.

FIG. 5 is a diagram showing a setting screen for setting printing of a transmission result after transmission of image data.

In FIG. 5, a function for printing the transmission result is called a report print function, and the setting screen shown in FIG. 5 is a setting screen related to the report print function.

The setting screen is displayed on the operation unit 133 shown in FIG. 3, and a title "Report Print Setting" is displayed on the setting screen. The setting screen displays "Transmission Result Report Output" and "Fax Transmission Result Report Output". "Provide Image" is displayed corresponding to the "Transmission Result Report Output", and similarly, "Provide Image" is displayed corresponding to "Fax Transmission Result Report Output".

Buttons 200 to 202 are displayed at "Transmission Result Report Output", and the button 200 is a button for setting printing of the transmission result report only when there is a transmission error. The button 201 is a button for setting printing of the transmission result report whenever transmission is executed. The button 202 is a button for setting not to print the transmission result report even if transmission is executed.

It should be noted that the buttons 200 to 202 are in an exclusive relationship, and only one of the buttons 200 to 202 can be selected. The button 200 is selected by default.

"Provide Image" corresponding to "Transmission Result Report Output" displays buttons 203 and 204. The buttons 203 and 204 are switches (SW) for selecting or setting (will be called "addition setting") whether to add, to the transmission result report, an image (additional image) on the first page of the image data transmitted by the SEND functions.

If the button 203 is selected, a part or all of the image on the first page of the transmitted image data is described on the transmission result report. On the other hand, if the button 204 is selected, the image on the first page of the transmitted image data is not described on the transmission result report.

In this way, if a part of the image is described on the transmission report, the user can easily determine, from the transmission result report, which image data is transmitted.

It should be noted that the buttons 203 and 204 are toggle SWs, and a user without system management authority cannot change the setting by the buttons 203 and 204. For example, if a malicious user intentionally causes a transmission error for a document (original) which is prohibited from copying, the user can acquire a copy of the image on the first page of the document. Therefore, as described above, the user without the system management authority is prohibited from changing the setting by the buttons 203 and 204. If a system manager selects the button 204 and sets "Do Not Provide Image", the above unauthorized copying can be prevented.

"Fax Transmission Result Report Output" displays buttons 205 to 207, and the buttons 205 to 207 are buttons for setting whether to print the fax transmission result report when the image data is transmitted by fax function.

The buttons 205 to 207 are buttons for the same setting as the buttons 200 to 202 at "Fax Transmission Result Report Output". Buttons 208 and 209 displayed at "Provide Image" corresponding to "Fax Transmission Result Report Output" are buttons for the same setting as the buttons 203 and 204.

The buttons 205 to 207 are in an exclusive relationship, and only one of the buttons 205 to 207 can be selected. The button 205 is selected by default. The buttons 208 and 209 are toggle SWs, and the user without system management authority cannot change the setting by the buttons 208 and 209.

It should be noted that two reports, the transmission result report and the fax transmission result report, may be printed in one transmission operation depending on the setting on the setting screen.

Figure 6:
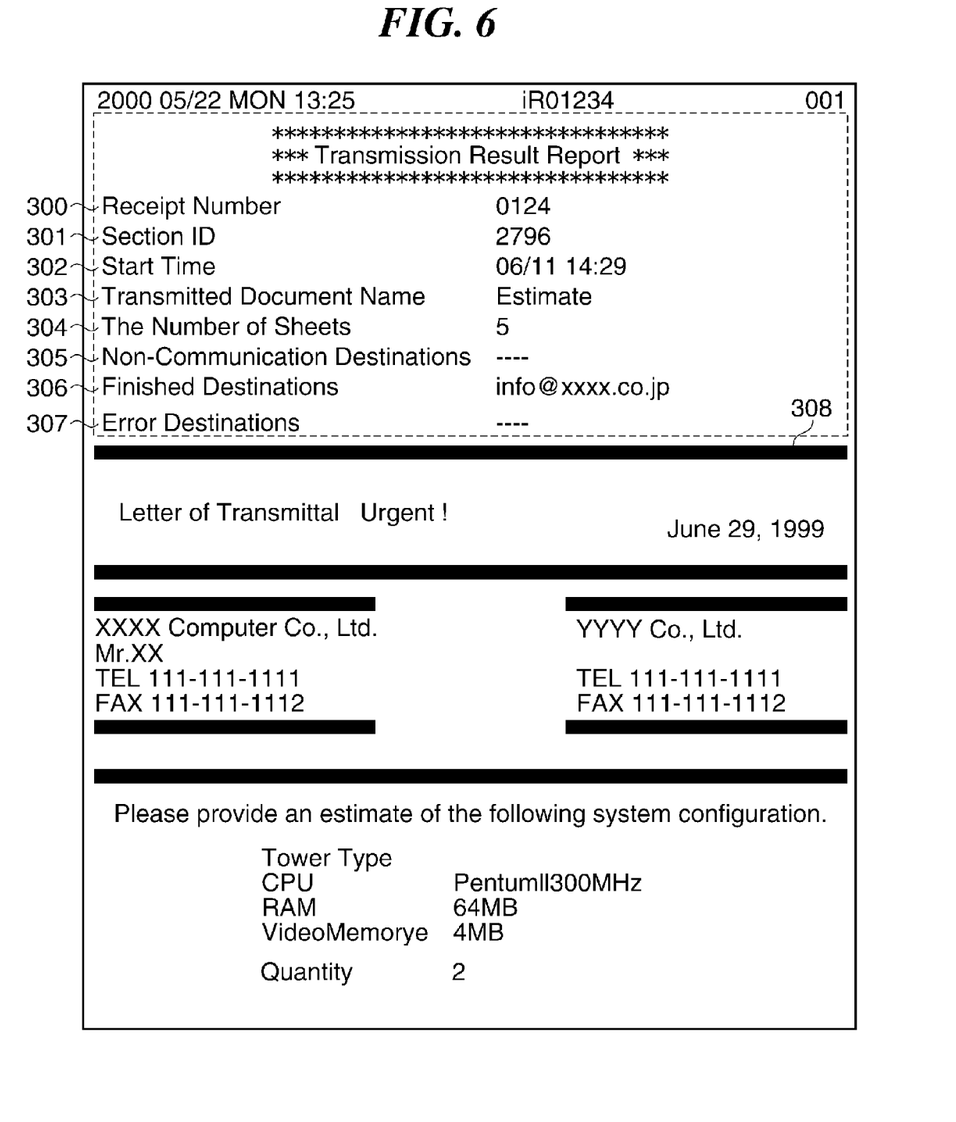
FIG. 6 is a diagram showing a first example of a transmission result report output by the full-color MFP shown in FIG. 1.

FIG. 6 is a diagram showing a first example of the transmission result report output by the MFP 100 shown in FIG. 1.

The shown transmission result report is printed when the button 201 of "Transmission Result Report Output" and the button 203 of "Provide Image" in "Report Print Setting" described in FIG. 5 are selected. A receipt number 300 is printed on the transmission result report. The receipt number 300 is incremented at each transmission, and one of numbers 0001 to 4999 is printed. The receipt number 300 is handled as a number for specifying a transmission job.

When the user uses the MFP 100, the user inputs from the operation unit 133 an ID of the section (section ID) to which the user belongs. In this way, the MFP 100 compiles the number of copies for each section. A section ID 301 is printed on the transmission result report.

As shown in FIG. 6, a start time 302, a transmitted document name 303, the number of sheets 304, non-communication destinations (addresses) 305, finished destinations 306, and error destinations 307 are printed on the transmission result report.

The start time 302 represents date and time of the start of the transmission of image data or an image file by the SEND functions. The transmitted document name 303 shows the name of a document input by the user from the operation unit 133 upon the transmission. The number of sheets 304 shows the number of sheets of the original read by the scanner 134.

The non-communication destinations 305 show addresses for each of which the transmission is not performed when a plurality of transmission addresses are designated, and the transmission is canceled in the middle. Meanwhile, the finished destinations 306 show addresses for each of which the transmission is normally performed. The error destinations 307 show addresses in each of which there is an error in the middle of the transmission.

If there is no address corresponding to the non-communication destinations 305, the finished destinations 306, and the error destination 307, a sign "-----" is printed on the transmission result report.

In the example shown in FIG. 6, an image 308 is further printed on the transmission result report. The image 308 is a part of the first page of the image data obtained as a result of reading of the original by the scanner 134. It should be noted that the "Urgent!" in the image 308 is printed in a red color image.

Figure 7:
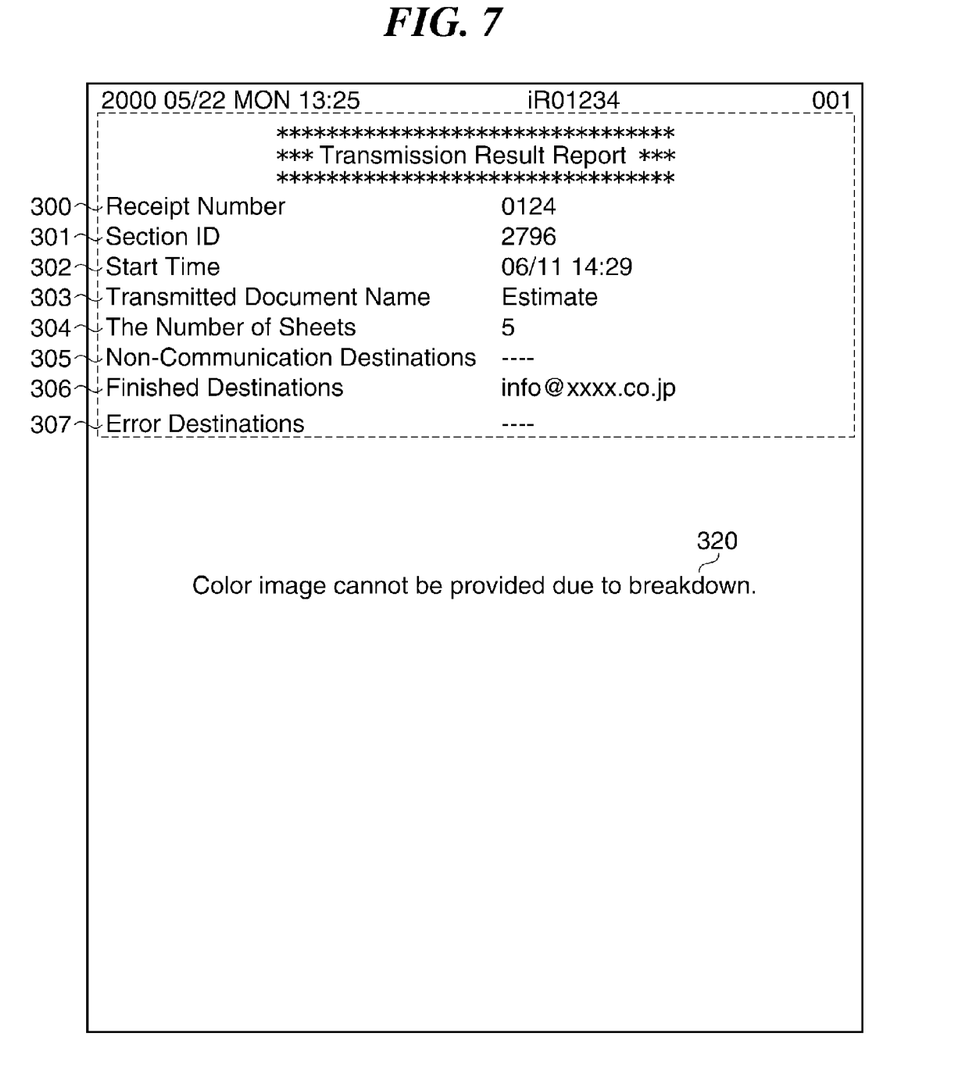
FIG. 7 is a diagram showing a second example of the transmission result report output by the full-color MFP shown in FIG. 1.

FIG. 7 is a diagram showing a second example of the transmission result report output by the MFP 100 shown in FIG. 1. It should be noted that in FIG. 7, the same reference numerals are provided to the same printing contents as in FIG. 6.

The example shown in FIG. 7 indicates a transmission result report when at least one of the mechanisms for printing yellow (Y), magenta (M), and cyan (C) colors is broken in the MFP 100, and color printing cannot be executed (color image cannot be printed).

If at least one of the mechanisms of the colors is broken, the CPU 130 displays a warning message for calling a service man on the operation unit 133 as described below.

Monochrome printing is possible in the state shown in FIG. 7. Meanwhile, the CPU 130 does not display the buttons necessary for color printing, such as color copying, and puts the MFP 100 into a color degenerate state for prohibiting the execution of color printing.

In the color degenerate state, since "Urgent!" in the image 308 shown in FIG. 6 is printed in red, the CPU 130 controls the printer 135 not to print the image 308 even if the button 203 is selected at "Provide Image". The CPU 130 controls the printer 135 to print in monochrome a message "Color image cannot be provided due to breakdown." indicated by reference numeral 320 on the transmission result report.

Figure 8:
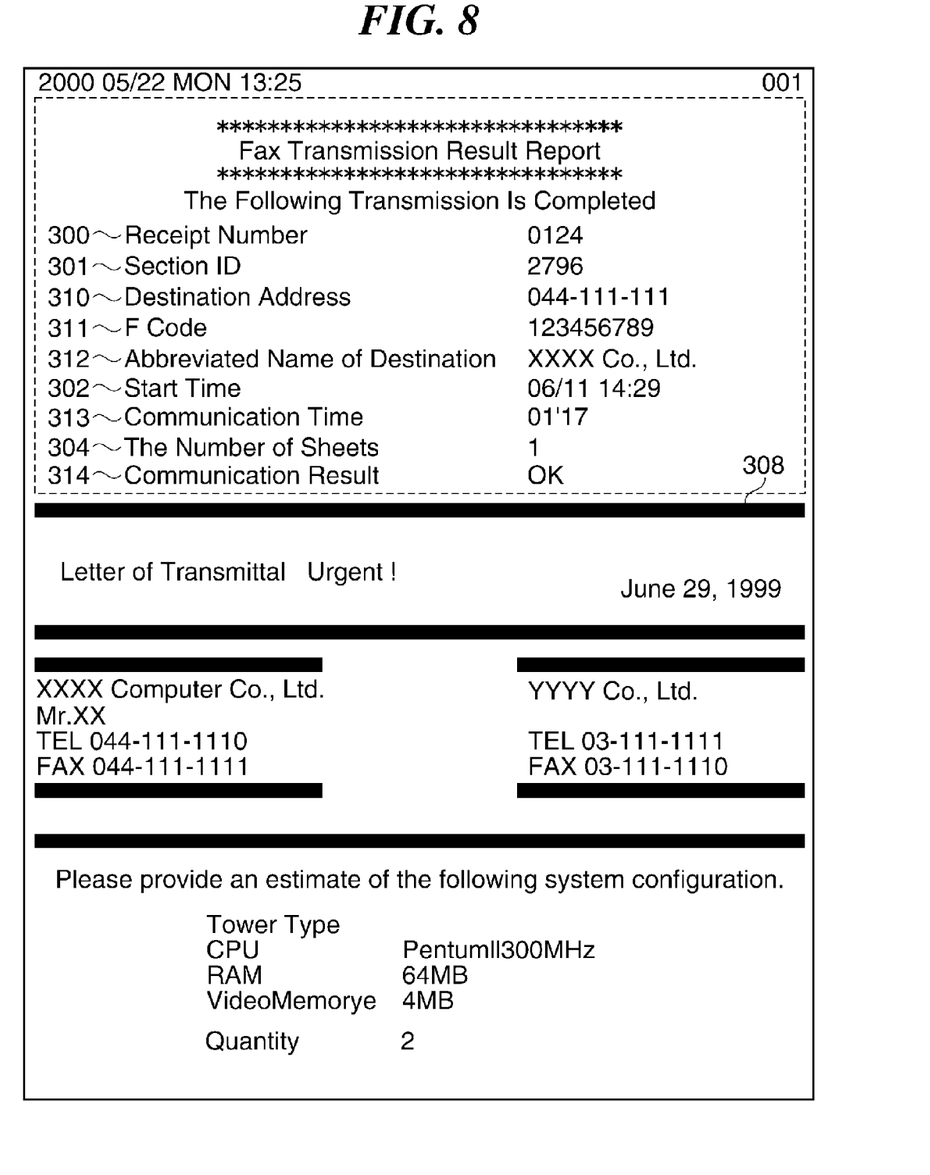
FIG. 8 is a diagram showing a first example of a fax transmission result report printed after transmission of a fax by the full-color MFP shown in FIG. 1.

FIG. 8 is a diagram showing a first example of the fax transmission result report printed after transmission of a fax by the MFP 100 shown in FIG. 1. It should be noted that in FIG. 8, the same reference numerals are provided to the same printing contents as in FIG. 6.

In the example shown in FIG. 8, the button 206 of "Fax Transmission Result Report Output" is selected, and the button 208 of "Provide Image" is selected in "Report Print Setting" described in FIG. 5.

In the fax transmission result report shown in FIG. 8, a destination address 310, an F code 311, an abbreviated name of destination 312, a communication time 313, and a communication result 314 are printed in addition to the receipt number 300, the section ID 301, the start time 302, and the number of sheets 304. It should be noted that the destination address 310, the F code 311, and the abbreviated name of destination 312 are data registered in an address book for managing transmission address information.

The destination address 310 represents a phone number of a transmission address, and the F code 311 is a number used to allocate forwarding destinations. The communication time 313 represents the time required for fax transmission, and the time is printed on the second time scale.

The result of the fax transmission is printed in the communication result 314, and "OK" is printed when the fax transmission is favorably finished. On the other hand, "NG" is printed, and a detail error code is printed when there is an error in the fax transmission.

Figure 9:
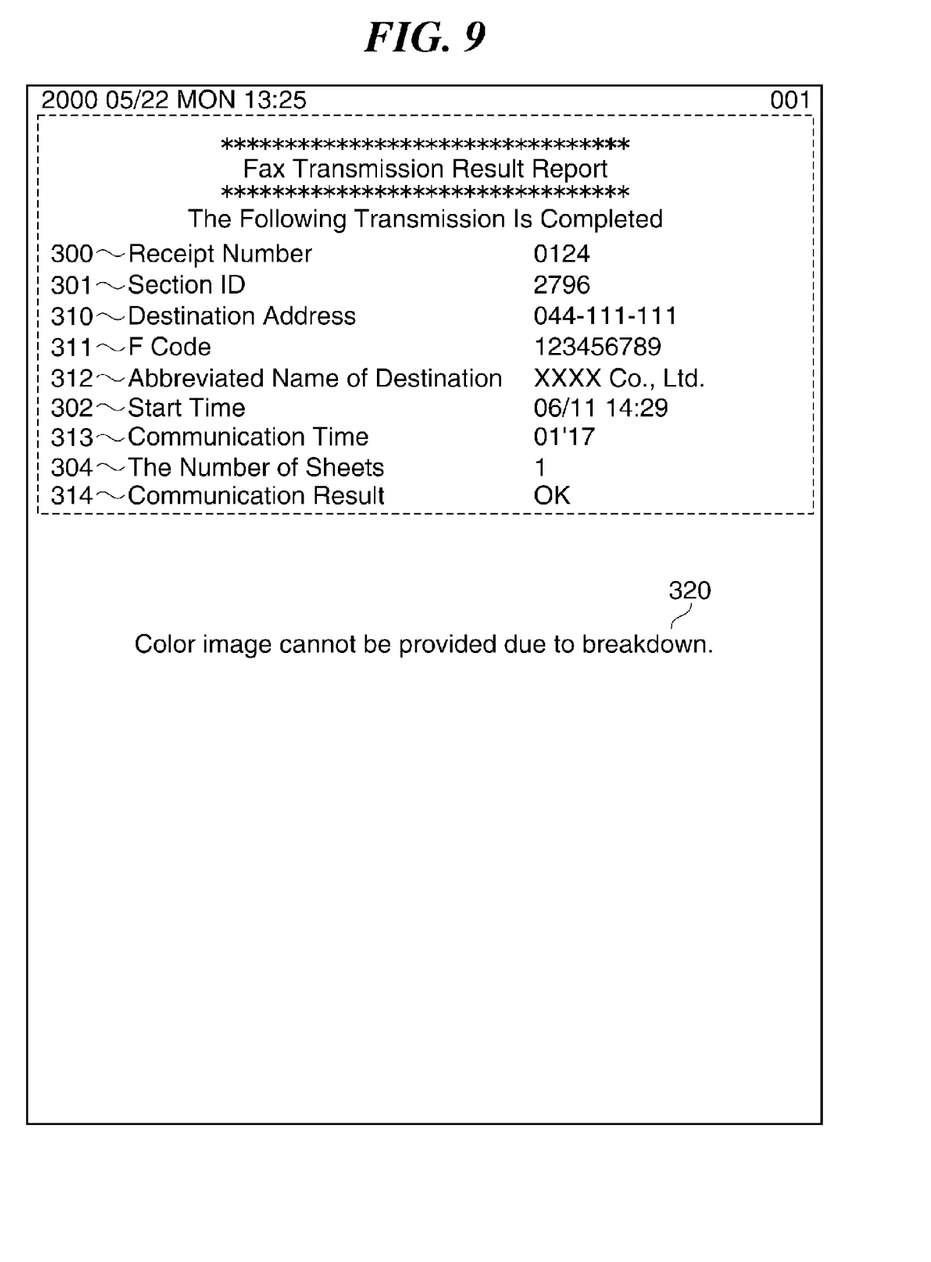
FIG. 9 is a diagram showing a second example of the fax transmission result report output by the full-color MFP shown in FIG. 1.

FIG. 9 is a diagram showing a second example of the fax transmission result report output by the MFP 100 shown in FIG. 1. It should be noted that in FIG. 9, the same reference numerals are provided to the same printing contents as in FIG. 8.

The example shown in FIG. 9 indicates a fax transmission result report when at least one of the mechanisms for printing yellow (Y), magenta (M), and cyan (C) colors is broken in the MFP 100, and color printing cannot be executed.

If at least one of the mechanisms of the colors is broken, the CPU 130 displays the warning message for calling a service man on the operation unit 133 as described below.

Monochrome printing is possible in the state shown in FIG. 9. Meanwhile, the CPU 130 does not display the buttons necessary for color printing, such as color copying, and the color degenerate state is set to prohibit the execution of color printing.

In the color degenerate state, since "Urgent!" in the image 308 shown in FIG. 8 is printed in red, the CPU 130 controls the printer 135 not to print the image 308 even if the button 208 is selected at "Provide Image". The CPU 130 controls the printer 135 to print in monochrome the message "Color image cannot be provided due to breakdown." indicated by reference numeral 320 on the fax transmission result report.

Figure 10:
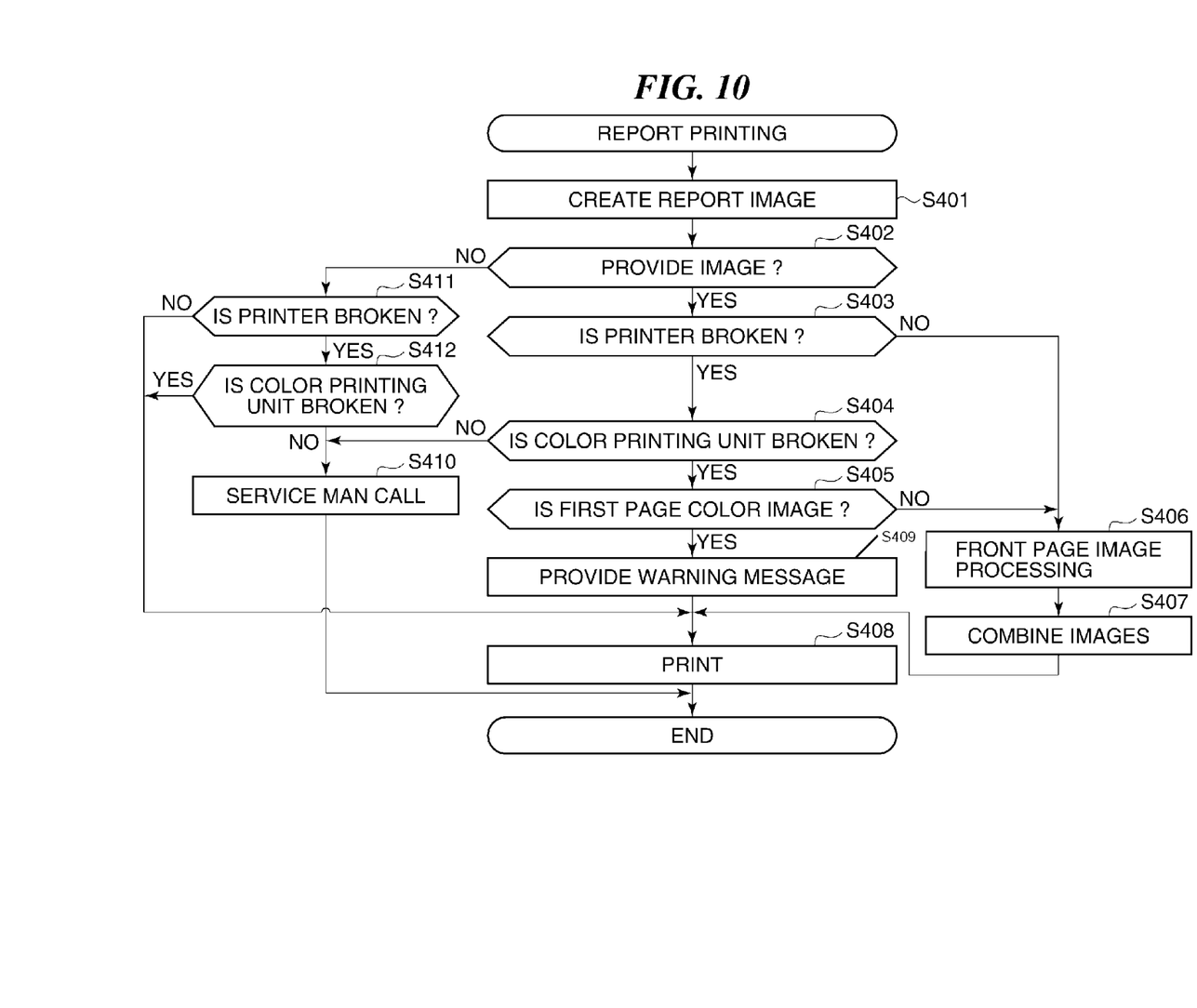
FIG. 10 is a flow chart for explaining a printing process of the transmission result report or the fax transmission result report in the full-color MFP shown in FIG. 1.

FIG. 10 is a flow chart for explaining a printing process of the transmission result report or the fax transmission result report in the MFP 100 shown in FIG. 1.

In FIGS. 2 and 10, if output of at least one of the transmission result report and the fax transmission result report (hereinafter, may be simply called "transmission result report") is selected in the report print setting described in FIG. 5, the CPU 130 executes a transmission result report printing process.

When the transmission result report printing process is started, the CPU 130 creates the transmission result report described in FIGS. 6 and 7 (step S401). The CPU 130 obtains from the receipt number 300 to the error destinations 307 according to log information recorded upon the transmission and creates a transmission result report image from a part of transmission result report information.

Similarly, the CPU 130 obtains from the receipt number 300 to the communication result 314 according to the log information recorded upon the transmission and creates a fax transmission result report image from a part of fax transmission result report information.

Next, the CPU 130 determines whether "Provide Image" is on (ON) (step S402). In this case, "Provide Image" is ON if the button 203 shown in FIG. 5 is selected in the case of the transmission result report and "Provide Image" is ON if the button 208 shown in FIG. 5 is selected in the case of the fax transmission result report.

If "Provide Image" is ON (YES in step S402), the CPU 130 determines whether the printer 135 is broken (step S403). If the printer 135 is broken (YES in step S403), the CPU 130 determines whether the broken part of the printer 135 is a mechanism related to color image printing (step S404).

Examples of the mechanisms related to color image printing include the photosensitive drums 1Y, 1M, and 1C, the cleaning units 2Y, 2M, and 2C, the developing units 3Y, 3M, and 3C, the transfer rollers 8Y, 8M, and 8C shown in FIG. 2, and motors for operating the units.

If the broken part of the printer 135 is a mechanism related to color image printing (also called "color printing mechanism") (YES in step S404), the CPU 130 checks whether the image to be added to the transmission result report is a color image (step S405). More specifically, the CPU 130 checks whether the first page to be printed includes a color image.

If the first page does not include a color image (NO in step S405), the CPU 130 controls the image processing circuit 136 to execute first page image processing of cutting out the first page from the transmitted image data and adjusting the size of the first page to the size of the transmission result report (step S406).

Next, the CPU 130 controls the image processing circuit 136 to combine the transmission result report image or the fax transmission result report image with the first page image to create combined image data (step S407).

The CPU 130 controls the printer 135 to print and output the transmission result report or the fax transmission result report in monochrome according to the combined image data (step S408). The CPU 130 terminates the transmission result report printing process.

On the other hand, if the first page includes a color image in step S405 (YES in step S405), the CPU 130 controls the image processing circuit 136 to add the warning message (warning text) described in FIG. 7 or 9 to the transmission result report image or the fax transmission result report image to create combined image data (step S409). Next, the CPU 130 moves to step S408 and prints the combined image in monochrome. A reason that a color image cannot be added is shown in the above-described warning message (warning text).

If the broken part of the printer 135 is not a mechanism related to color image printing in step S404 (NO in step S404), i.e. if the broken part is a part other than the color printing mechanisms, the CPU 130 displays on the operation unit 133 a service man call (warning display) indicating there is a need to call a service man (step S410) and terminates the transmission result report printing process.

In this way, if the broken part is not a mechanism related to color image printing, it is determined that a unit for monochrome printing is broken so that the breakdown affects the entire printing operation. Therefore, the CPU 130 displays the service man call on the operation unit 133.

In the service man call, a text "Call service man." and an error code number are displayed on the operation unit 133, and the broken part can be specified. It should be noted that the CPU 130 displays the service man call on the front surface of the screen of the operation unit 133 to prohibit a further operation.

If the printer 135 is not broken in step S403 (NO in step S403), the CPU 130 makes the flow proceed to step S406. After processing the first page and combining the images, the CPU 130 prints the transmission result report or the fax transmission result report in step S408. In this case, the first page image, etc., are printed in full color.

It should be noted that if "Provide Image" is not ON in step S402 (NO in step S402), the CPU 130 determines whether the printer 135 is broken in step S411. If the printer 135 is broken (YES in step S411), the CPU 130 determines in step S412 whether the broken part of the printer 135 is a mechanism related to color image printing.

If the broken part of the printer 135 is a mechanism related to color image printing (YES in step S412), the CPU 130 makes the flow proceed to step S408 and prints the transmission result report image or the fax transmission result report image as the transmission result report or the fax transmission result report, respectively.

On the other hand, if the broken part of the printer 135 is not a mechanism related to color image printing (NO in step S412), the CPU 130 makes the flow proceed to step S410 and displays the service man call on the operation unit 133.

It should be noted that if the printer 135 is not broken, the CPU 130 proceeds to step S408 and prints the transmission result report image or the fax transmission result report image as the transmission result report or the fax transmission result report, respectively.

In this way, the MFP according to the present embodiment has advantages that the transmission result report can be output even if a part of the printing mechanisms is broken and that the use of the communication function is not terminated.

More specifically, in the present embodiment, if the color printing mechanisms are broken upon adding a part of image data to the transmission result report as an additional color image to print the transmission result report, the transmission result report is printed without adding the additional color image to the transmission result report. Therefore, the transmission function can be used while obtaining the transmission result report even if a part of the printing mechanisms is broken. Moreover, the confusion of the user caused by adding a monochrome image to the transmission result report in spite of the transmission of color image data can be prevented.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application No. 2010-279277 filed Dec. 15, 2010, which is hereby incorporated by reference herein in its entirety.

What is claimed is:

1. An image forming apparatus comprising:
a printing unit capable of printing a color image and a monochrome image;
a transmission unit configured to transmit image data to a transmission address;
a generating unit configured to generate a transmission result report showing a result of transmission by said transmission unit, wherein the transmission result report is a monochrome image;
a setting unit configured to set whether to add at least a part of the image data transmitted by said transmission unit to the transmission result report as an additional image;
a determining unit configured to determine, when printing the transmission result report, whether or not said printing unit can print a color image; and
a control unit configured to control said printing unit to print the transmission result report without adding the additional image even if said setting unit sets to add the additional image, when the image data transmitted by said transmission unit is a color image and when said determining unit determines that said printing unit cannot print a color image.

2. The image forming apparatus according to claim 1, wherein
said control unit controls to add the additional image to the transmission result report if said setting unit sets to add the additional image, when the image data transmitted by said transmission unit is a monochrome image and when said printing unit cannot print a color image and can print a monochrome image.

3. The image forming apparatus according to claim 1, wherein
said control unit controls to add a message, which shows a reason that a color image cannot be added, to the transmission result report in monochrome in place of the additional image, when the image data transmitted by said transmission unit is a color image and when said printing unit cannot print a color image and can print a monochrome image.

4. The image forming apparatus according to claim 1, wherein a situation in which said printing unit cannot print a color image corresponds to a situation in which mechanisms for color printing are broken.

5. The image forming apparatus according to claim 1, wherein the transmission result report contains at least one of a transmission start time, destination information and transmission result.

6. The image forming apparatus according to claim 1, wherein said transmission unit transmits the image data by facsimile communication.

7. The image forming apparatus according to claim 1, further comprising a display unit configured to display a setting screen for setting whether at least a part of the image data transmitted by said transmission unit is added to the transmission result report as an additional image, wherein
said setting unit performs setting concerning addition of at least a part of the image data in accordance with user's operation on the setting screen.

8. The image forming apparatus according to claim 1, wherein on the setting screen, whether the transmission result report is printed can be set.

9. A control method of an image forming apparatus including a printing unit capable of printing a color image and a monochrome image and a transmission unit configured to transmit image data to a transmission address, the control method comprising:
a generating step of generating a transmission result report showing a result of transmission by the transmission unit, wherein the transmission result report is a monochrome image;
a setting step of setting whether to add at least a part of the image data transmitted by the transmission unit to the transmission result report as an additional image; and
a determining unit configured to determine, when printing the transmission result report, whether or not said printing unit can print a color image;
a control step of controlling said printing unit to print the transmission result report without adding the additional image even if it is set to add the additional image in said setting step, when the image data transmitted by the transmission unit is a color image and when the determining step determines that said printing unit cannot print a color image.

10. A computer-readable non-transitory storage medium storing a control program for causing a computer to execute a control method of an image forming apparatus including a printing unit capable of printing a color image and a monochrome image and a transmission unit configured to transmit image data to a transmission address, the method comprising:
a generating step of generating a transmission result report showing a result of transmission by the transmission unit, wherein the transmission result report is a monochrome image;
a setting step of setting whether to add at least a part of the image data transmitted by the transmission unit to the transmission result report as an additional image; and
a determining unit configured to determine, when printing the transmission result report, whether or not said printing unit can print a color image;
a control step of controlling said printing unit to print the transmission result report without adding the additional image even if it is set to add the additional image in said setting step, when the image data transmitted by the transmission unit is a color image and when the determining step determines that said printing unit cannot print a color image.

* * * * *